(12) United States Patent
Shimo et al.

(10) Patent No.: US 7,758,334 B2
(45) Date of Patent: Jul. 20, 2010

(54) VALVELESS PULSED DETONATION COMBUSTOR

(75) Inventors: Masayoshi Shimo, West Lafayette, IN (US); Scott E. Meyer, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 375 days.

(21) Appl. No.: 11/691,984

(22) Filed: Mar. 27, 2007

(65) Prior Publication Data
US 2007/0245712 A1    Oct. 25, 2007

Related U.S. Application Data

(60) Provisional application No. 60/786,462, filed on Mar. 28, 2006.

(51) Int. Cl.
*F23C 15/00*    (2006.01)
*F02K 7/02*    (2006.01)
*F02C 5/00*    (2006.01)
*F02G 1/00*    (2006.01)

(52) U.S. Cl. .......................... 431/1; 60/249; 60/39.76; 60/39.77

(58) Field of Classification Search .................. 431/1, 431/2; 60/247, 39.76, 39.77
See application file for complete search history.

(56) References Cited

U.S. PATENT DOCUMENTS

| 2,743,575 | A | | 5/1956 | Brzozowski |
| 2,998,705 | A | | 9/1961 | Porter et al. |
| 3,354,650 | A | * | 11/1967 | Malroux ..................... 60/249 |
| 3,543,781 | A | | 12/1970 | Kentfield |
| 3,910,494 | A | | 10/1975 | Melton |
| 4,033,120 | A | | 7/1977 | Kentfield |
| 4,671,056 | A | | 6/1987 | Genz et al. |
| 5,118,281 | A | * | 6/1992 | Bramlette et al. ............... 431/1 |
| 5,123,835 | A | * | 6/1992 | Richards et al. ................ 431/1 |
| 5,855,827 | A | * | 1/1999 | Bussing et al. ................. 264/7 |
| 6,062,018 | A | * | 5/2000 | Bussing ..................... 60/39.39 |
| 6,216,446 | B1 | | 4/2001 | Stram |
| 6,382,959 | B2 | * | 5/2002 | Turk et al. ..................... 431/12 |
| 6,666,018 | B2 | * | 12/2003 | Butler et al. ................. 60/226.1 |
| 6,901,738 | B2 | | 6/2005 | Sammann et al. |
| 6,978,616 | B1 | | 12/2005 | Schauer |
| 7,131,260 | B2 | * | 11/2006 | Dean et al. ................. 60/39.76 |

(Continued)

OTHER PUBLICATIONS

Shimo et al., "Multicyclic Detonation Initiation Studies in Valveless Pulsed Detonation Combustors," 42nd AIAA/ASME/SAE/ASEE Joint Propulsion Conference and Exhibit, Jul. 9-12, 2006, Sacramento, California, 20 pages.

(Continued)

*Primary Examiner*—Kenneth B Rinehart
*Assistant Examiner*—Frances Kamps
(74) *Attorney, Agent, or Firm*—William F. Bahret

(57) ABSTRACT

Pulse detonation combustors of valveless construction. One valveless pulse detonation combustor, having a tube with a closed end and an open end, is constructed with a flame accelerator within the tube, adjacent the open end. A valveless, apertured flow restrictor is positioned between the flame accelerator and the closed end of the tube. A sparking device is positioned within the tube, between the flow restrictor and the flame accelerator. Valveless fuel and air ports are positioned between the flow restrictor and the closed end of the tube. Substantially right-angle manifold passageways are in communication with each of the ports.

15 Claims, 16 Drawing Sheets

U.S. PATENT DOCUMENTS

| | | | | |
|---|---|---|---|---|
| 7,340,903 | B2* | 3/2008 | Lu et al. | 60/776 |
| 7,464,534 | B2* | 12/2008 | Daniau | 60/39.76 |
| 2005/0144959 | A1* | 7/2005 | Lu et al. | 60/776 |
| 2007/0180814 | A1* | 8/2007 | Tangirala et al. | 60/204 |
| 2008/0006019 | A1* | 1/2008 | Tangirala et al. | 60/39.76 |

OTHER PUBLICATIONS

Kentfield, John, "Nonsteady, One-Dimensional, Internal, Compressible Flows Theory and Applications," Oxford University Press, New York, 1993, Chapter 8, "Pulse Combustors," pp. 191-235.

Schauer et al., "Detonation Initiation Studies and Performance Results for Pulsed Detonation Engine Applications," 39th AIAA Aerospace Sciences Meeting and Exhibit, Jan. 8-11, 2001, Reno, Nevada, 10 pages.

Brophy et al., "Initiator Performance for Liquid-Fueled Pulse Detonation Engines," 40th AIAA Aerospace Sciences Meeting and Exhibit, Jan. 14-17, 2002, Reno, Nevada, 9 pages.

Brophy et al., "Performance Characterization of a Valveless Pulse Detonation Engine," 41st AIAA Aerospace Sciences Meeting and Exhibit, Jan. 6-9, 2003, Reno, Nevada, 11 pages.

Kailasanath, K., "Review of Propulsion Applications of Detonation Waves," AIAA Journal, vol. 38, No. 9, Sep. 2000, pp. 1698-1708.

Roy et al., "Pulse Detonation Propulsion: Challenges, Current Status, and Future Perspective," Progress in Energy and Combustion Science, vol. 30, No. 6, 2004, pp. 545-672.

Kelly, J., "After Combustion: Detonation!," [online], Aug. 2003, retrieved from the Internet: <http://www.popsci.com/military-aviation-space/article/2003-08/after-combustion-detonation?page=1>.

"Pulse Jet Engine," [online], Wikipedia, [retrieved on Mar. 21, 2008], retrieved from the Internet: <http://en.wikipedia.org/wiki/Pulse_jet_engine>.

"Pulse Detonation Engine," [online], Wikipedia, [retrieved on Mar. 21, 2008], retrieved from the Internet: <http://en.wikipedia.org/wiki/Pulse_detonation_engine>.

"Valveless Pulse Jet," [online], Wikipedia, [retrieved on Mar. 21, 2008], retrieved from the Internet: <http://en.wikipedia.org/wiki/Valveless_Pulse_Jet>.

Brophy et al., "Fuel Distribution Effects on Pulse Detonation Engine Operation and Performance," Journal of Propulsion and Power, vol. 22, No. 6, Nov.-Dec. 2006, pp. 1155-1161.

Cooper et al., "Effect of Porous Thrust Surfaces on Detonation Transition and Detonation Tube Impulse," Journal of Propulsion and Power, vol. 20, No. 5, Sep.-Oct. 2004, pp. 811-819.

Shimo et al., "Multicyclic-Detonation-Initiation Studies in Valveless Pulsed Detonation Combustors," Journal of Propulsion and Power, vol. 24, No. 2, Mar.-Apr. 2008, pp. 336-344.

Baklanov et al., "Investigation of Pulse-Detonation Engine Operating On Gasoline-Air Mixture,", Proceedings of the 14th ONR Propulsion Meeting, Aug. 9-10, 2001. pp. 148-153.

Wintenberger, Eric, "Application of Steady and Unsteady Detonation Waves to Propulsion," Ph.D. Dissertation, Graduate Aeronautical Laboratories at the California Institute of Technology, California Institute of Technology, Pasadena, California, 2004, 335 pages.

Werner, Steven, "Initiator Diffraction Limits for Pulse Detonation Engine Operation," Master's Thesis, Naval Postgraduate School, Monterey, California, Dec. 2002, 63 pages.

Simpson, Bruce, Pulse Detonation Engines, [retrieved on Sep. 10, 2009], retrieved from the Internet: <http://www.aardvark.co.nz/pjet/pde/shtml>.

"Pulse Detonation Engine," [online], Wikipedia, [retrieved on Sep. 10, 2009], retrieved from the Internet: <http://en.wikipedia.org/wiki/Pulse_Detonation_Engine>.

* cited by examiner

VALVELESS PULSED DETONATION COMBUSTOR

CROSS-REFERENCE TO RELATED APPLICATION

This application claims the benefit of U.S. Provisional Patent Application Ser. No. 60/786,462, filed Mar. 28, 2006, which application is hereby incorporated by reference.

TECHNICAL FIELD OF THE INVENTION

The present invention relates generally to power generation and, more particularly, to pulsed detonation combustors.

BACKGROUND OF THE INVENTION

A detonation is a supersonic combustion wave associated with a shock wave propagating through a reactive mixture. The self-sustained detonation wave has a particular pressure and propagation velocity described as the Chapman-Jouget detonation. The Chapman-Jouget detonation shows a similar thermodynamic behavior to a constant volume combustion process which provides higher thermodynamic performance than constant pressure combustion. A pulsed detonation combustor (PDC) is a device which creates the self-sustained detonation waves in a cyclic fashion in order to convert their thermal energy to kinetic energy. Potential applications include engines in subsonic and supersonic flight, vehicles, and industrial power generators.

One of the technical challenges in pulsed detonation combustor is a valving scheme. Because of the unsteady nature of the wave, the combustor needs to provide combustible mixture in a cyclic fashion. FIG. 1 shows a schematic chronology of a cyclic ideal operation for a valved pulsed detonation combustor. Once the fill valve is closed, after the combustion mixture filling process, ignition is provided by a spark plug and deflagration to detonation transition process is initiated by a flame accelerator. After a short period of time, the purge valve starts to open to exhaust combustion products and to prepare the tube for the next filling process. A valved structure is able to realize a cyclic unsteady detonation initiation but it requires an additional mechanical complexity and poses mechanical/thermal fatigue issues for its long service.

SUMMARY OF THE INVENTION

The present invention involves aspects of valveless pulse detonation combustors. One valveless pulse detonation combustor, having a tube with a closed end and an open end, is constructed with a flame accelerator within the tube, adjacent the open end. A valveless, apertured flow restrictor is positioned between the flame accelerator and the closed end of the tube. A sparking device is positioned within the tube, between the flow restrictor and the flame accelerator. Valveless fuel and air ports are positioned between the flow restrictor and the closed end of the tube. Substantially right-angle manifold passageways are in communication with each of the ports.

The objects and advantages of the present invention will be more apparent upon reading the following detailed description in conjunction with the accompanying drawings.

DETAILED DESCRIPTION OF PREFERRED EMBODIMENTS

Figure 1:
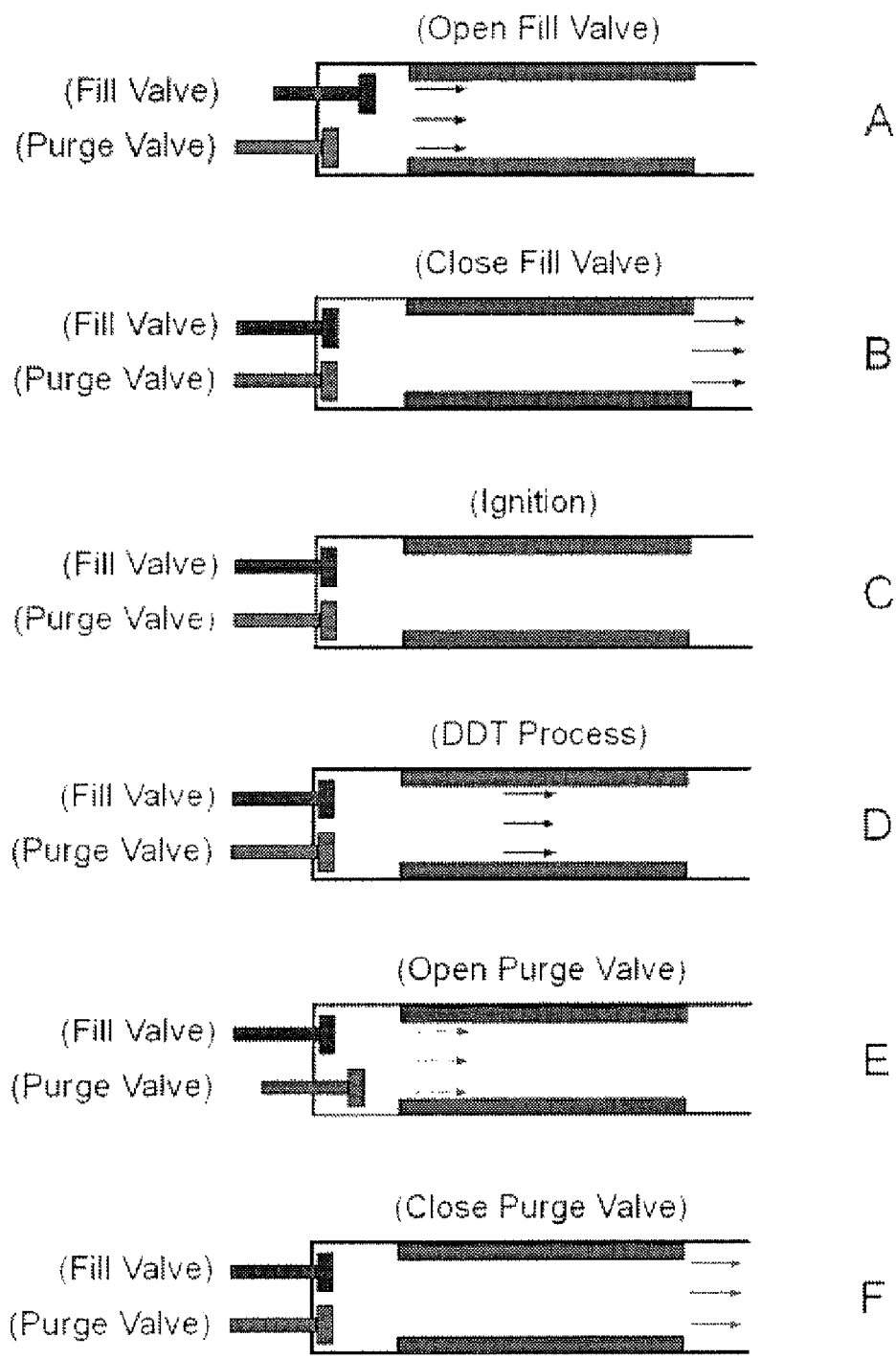
FIG. 1 is a schematic of the ideal cyclic operation of a valved PDC.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

One embodiment of a valveless pulse detonation combustor (10) according to the present invention is shown in FIGS.

2 and 3, comprising three major sections: inlet section 12, vortex generator 14, and detonation tube 16. The detonation tube 16 contains a Shchelkin spiral 18 (FIG. 5) as a flame accelerator. In one example combustor, the selection of blockage ratio, designed as the blocked area divided by the detonation tube cross-sectional area, is 0.44. The detonation tube shown is made of 2 inch I.D. stainless steel pipe.

Figure 2:
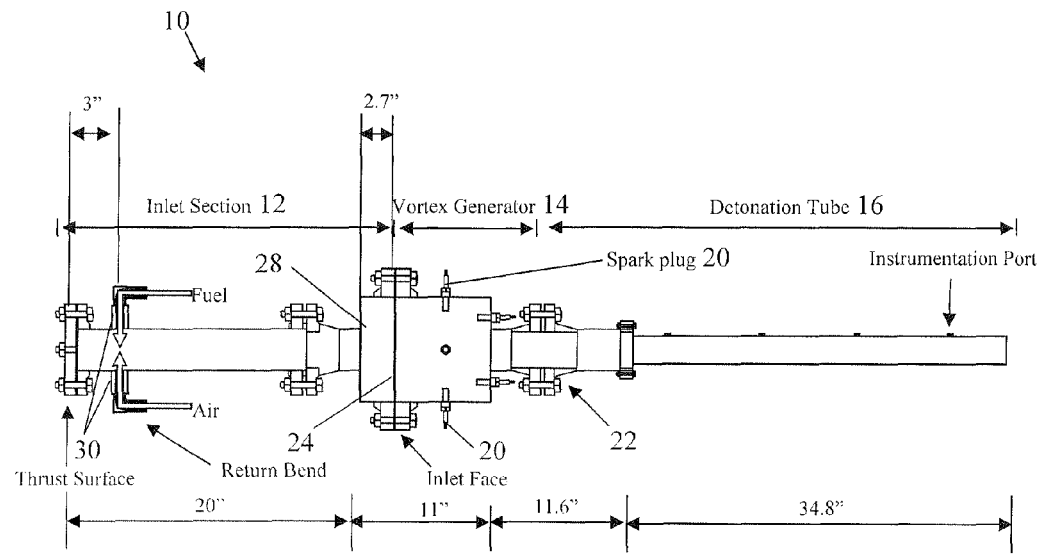
FIG. 2 is a side view of a first embodiment of a valveless PDC according to one aspect of the present invention.
Figure 3:
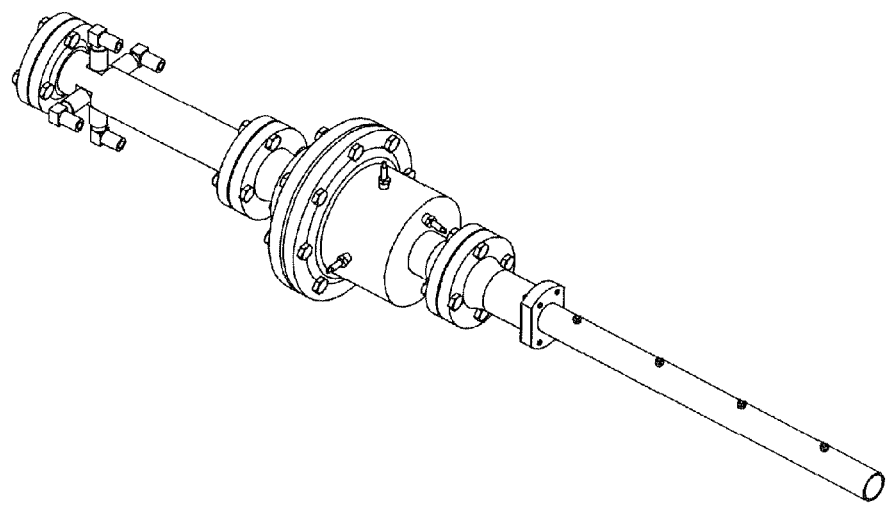
FIG. 3 is a perspective view of the valveless PDC of FIG. 2.

An acceptable pitch size for single-head spin detonation is related to its spinning pitch size of the marginal detonation. It has been found that the detonability limit for spin pitch size is based on the acoustic theories. Theory predicts the ratio of spin pitch to the critical tube diameter, $d_c$, and its pitch size is estimated on the order of the cell size, $\lambda$, for $d_c \sim \lambda/1.7$ The vortex generator 14 is constructed to provide sufficient flow recirculation zones for flame stabilization and mitigation of flame blowout under high speed filling without a large pressure loss across a step. The vortex generator shown steps down from an 8 inch internal diameter carbon steel tube to a 2 inch internal diameter carbon steel tube. As shown in FIGS. 2 and 3, spark plugs 20 and associated voltage discharge modules (not shown) are used to ignite the combustible mixture upstream of the contracting section 22 so as to create a quasi-stable recirculation zone of unsteady flow. Multiple spark plugs are mounted radially in order to assure ignition of the combustible mixture. (The number of spark plugs may vary depending upon the particular application.) The total energy provided by the forced ignition is a minuscule amount compared with the critical energy required for direct initiation with stoichiometric ethylene-air (56 kJ) and stoichiometric propane-air combustible mixtures (215 kJ).

Figure 4:
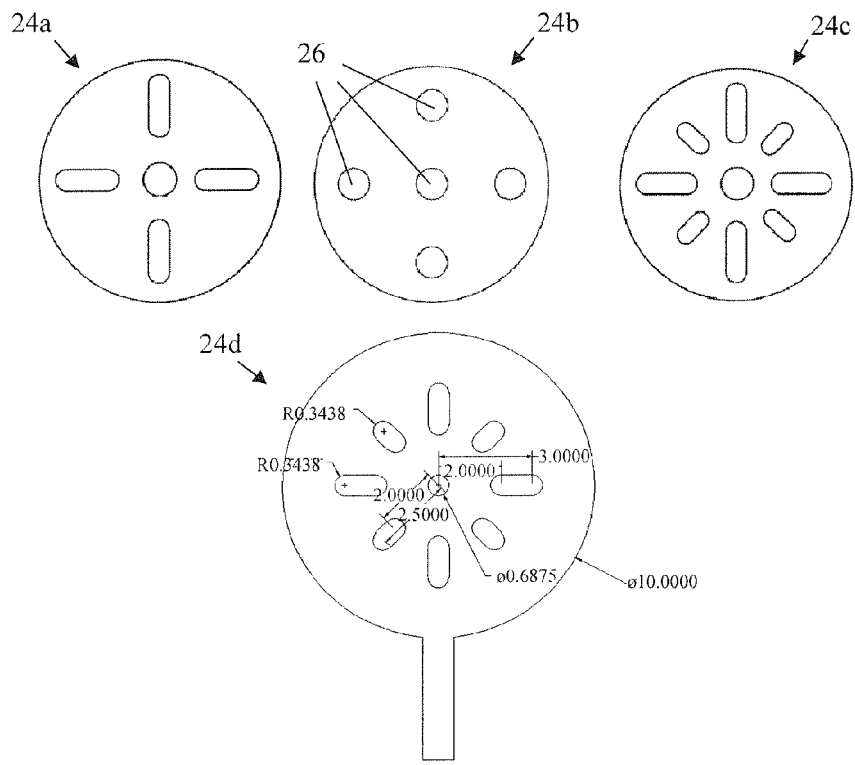
FIG. 4 shows three variants of the inlet face used in the valveless PDC of FIG. 2.

The inlet face 24 is positioned approximately at the middle of the vortex generator 14 (downstream of the inlet section 12) as a stationary flow restrictor. The inlet face generally comprises a perforated plate with one or more apertures therethrough. The plate may be circular (as shown in FIG. 4), or generally square or rectangular in design, depending upon the particular valveless PDC application. The apertures through the inlet faces may be cut straight through the discs, as shown, or may be tapered or angled inwardly or outwardly in certain applications. Inlet face 24 provides valveless operation, and acts as a fluid diode, providing the lowest possible resistance to inflow and the highest possible resistance to backflow. Inlet face 24 also serves as a mixing device during filling processes and as a thrust surface during the backflow phase of operation. The inlet face, with its multiple holes, promotes free shear flows within the vortex generator 14 thereby developing mixing layers that reduce mixing time and permit a higher operating frequency.

FIG. 4 shows three different 8 inch I.D. circular inlet faces 24a, 24b, 24c, and 24d made of ⅛ inch thick stainless steel, which may be used in the valveless PDC shown in FIGS. 2 and 3. Inlet face 24b, for example, has five 1 inch diameter apertures 26 therethrough, with the four outer apertures spaced ½ the radius away from the center aperture. The five apertures occupy approximately 3.9 square inches of the approximately 50.2 square inch inlet face, resulting in about 8 percent open space.

The inlet section 12 is preferably made of carbon steel pipe (3 inch inner diameter pipe is shown in FIGS. 2 and 3. Other sizes may be used depending upon the application.) and has an instantaneous expanded section 28 connected to inlet face 24. The longer inlet section effectively serves as a buffer zone to restrain backflow from reaching inlet ports 30. A longer inlet provides a greater buffer zone at the expense of a longer flow time and reduced operating frequency. One of the technical issues in a valveless combustor is a backflow of hot combustion products which is generated during the closing phase of a gas dynamic valve. This is a part of the loss associated with a valveless configuration, and the amount of loss can be decreased by reducing inlet sizes avoiding flashback to the fuel manifold or the buffer zone. However, reduction of inlet size decreases its flow coefficient causing an undesirable increase of manifold pressure. Heat transfer on the inlet wall can be increased by various cooling schemes in order to increase inlet port diameter impeding flashback with an optimized manifold pressure and a flow coefficient.

The instantaneous expanded section 28 behind the inlet face 24 also serves to enhance a preconditioning of combustible mixture through a mixing process with remaining combustion products from a previous cycle.

Inlet ports 30 for fuel and air supply are constructed of 90 degree elbows and may contain solenoid valves for emergency shutoff. There are four inlet ports for air supply and one inlet port for fuel supply separately connected to the inlet section 12 in order to impede flame propagation to manifolds during the backflow phase. This configuration, also called a 180 degree return bend (substantially 180 degrees), serves as a thrust generator during the backflow in order to minimize backflow-induced pressure losses. The number of inlet ports may vary, depending upon the estimated range of valveless operating frequency and fill fraction. Air and fuel manifold pressures, which are estimated by their flow coefficients and expected mass flow rates in quasi-steady operation, set the aerodynamic valve operating times.

The valveless PDC is preferably filled in a cyclic fashion with an air-fuel mixture, such as ethylene-air or propane-air mixtures, near stoichiometric conditions at various fill fractions and operating frequencies. Mass flow rates for fuel and air are preferably controlled through critical flow measurements with sonic orifice plates. Averaged mass flow rates may be controlled based on a volumetric fill fraction, an equivalence ratio, and an operating frequency of the valveless PDC. The operating frequency of the PDC may be controlled by an ignition control system (not shown) arranged with automobile ignition modules and digital timer/counter boards. One such ignition control system has been designed to provide digital pattern outputs to the ignition modules in 20 MHz external handshaking mode. The system was also capable of accepting 80 MHz digital output frequency to decide a certain event timing to control 32 ignition modules.

Figure 5:
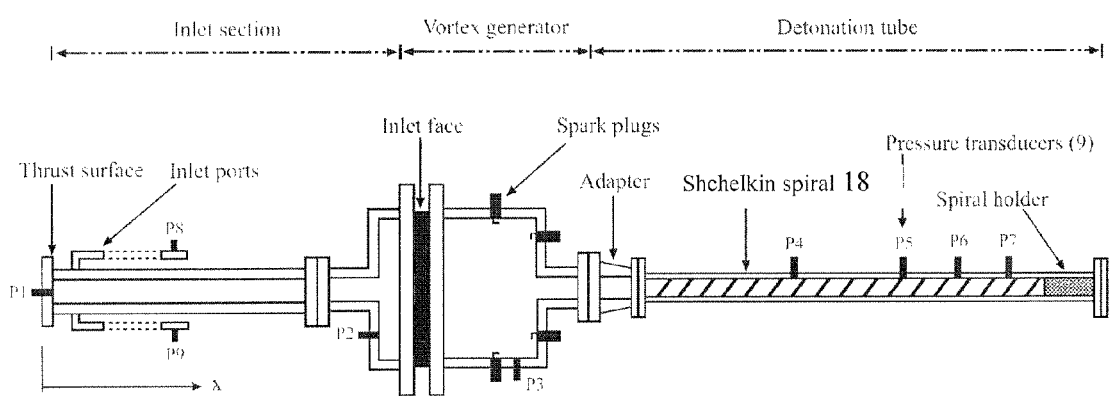
FIG. 5 is a diagram of the valveless PDC of FIG. 2, showing placement of pressure sensors.

There were seven piezoelectric pressure transducers and two low-natural frequency pressure transducers mounted in locations as indicated in FIG. 5 during experimental testing (described below) of the valveless PDC 10: the thrust surface (P1), the inlet section (P2), the vortex generator (P3), fuel and air manifolds (P8 and P9) and along the detonation tube (P4-P7). The article "Multicyclic Detonation Initiation Studies in Valveless Pulsed Detonation Combustors," by M. Shimo and S. Hester, 42$^{nd}$ AIAA/ASME/SAE/ASEE Joint Propulsion Conference & Exhibit, Jul. 9-12, 2006, Sacramento, Calif., AIAA 2006-4308, and "Multicyclic Detonation Initiation Studies in Valveless Pulsed Detonation Combustors," Ph.D. Thesis, Purdue University, West Lafayette, Ind., December 2006, are expressly incorporated by reference herein, along with all references cited therein.

Figure 6:
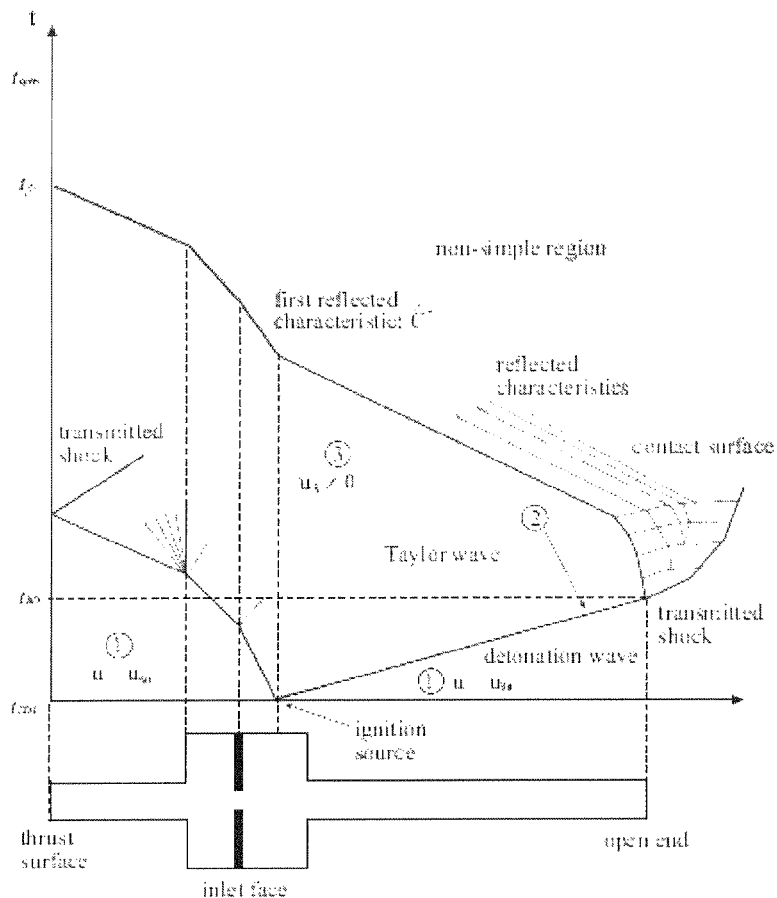
FIG. 6 is a space-time diagram of the detonation wave and transmitted shock propagations inside the valveless PDC of FIG. 2.

Details of various wave propagations after a direct initiation of detonation are illustrated by a space-time wave diagram in FIG. 6, showing essential features of wave dynamics in an ideal situation. The reactant state is labeled on FIG. 6 as State 1 where there is non-stagnant flow present initially in filling the entire tube with $u=u_{fill}$. State 2 represents the Chapman-Jouguet state followed by the self-similar expansion wave called the Taylor wave, just behind the detonation wave. The flow behind the Chapman-Jouguet detonation wave (State 2) is subsonic relative to the tube for typical hydrocarbon fuel-air mixtures. The first reflected characteristic $\hat{C}^-$ appears after the detonation wave front reaches the interface between combustion mixture and air at the open end of tube. The slope of this characteristic is specified by interaction with the Taylor wave. The transmitted shock and contact surface propagate outside the detonation tube making the flow expand radially in three dimensions. The region behind the first reflected characteristic is a non-simple region caused by interactions between the reflected expansion wave and the Taylor wave.

The Taylor wave makes the flow expand and decrease in pressure, but because of the porous surface of inlet face 24, the Taylor wave needs to further expand the flow from $u_2$ to a negative flow speed of $u_3$ in State 3. The first reflected characteristic $\hat{C}^-$ propagates at speed $u_3+u_3$ after passing through the Taylor wave due to this non-stagnant region, State 3. This characteristic continues to propagate through variable cross sectional area to reduce pressure at the thrust surface 32. A compression wave propagates toward the inlet section 12 as a transmitted shock due to this converging configuration of the vortex generator 14. The transmitted shock brings the reactant flow to rest at the inlet section 12 and increases the pressure at the inlet section as a consequence of the backflow process. Fuel and airflows may be metered upstream such that the respective flow rates are insensitive to changes in manifold pressure, i.e. upstream orifices remained choked throughout the process.

Figure 7:
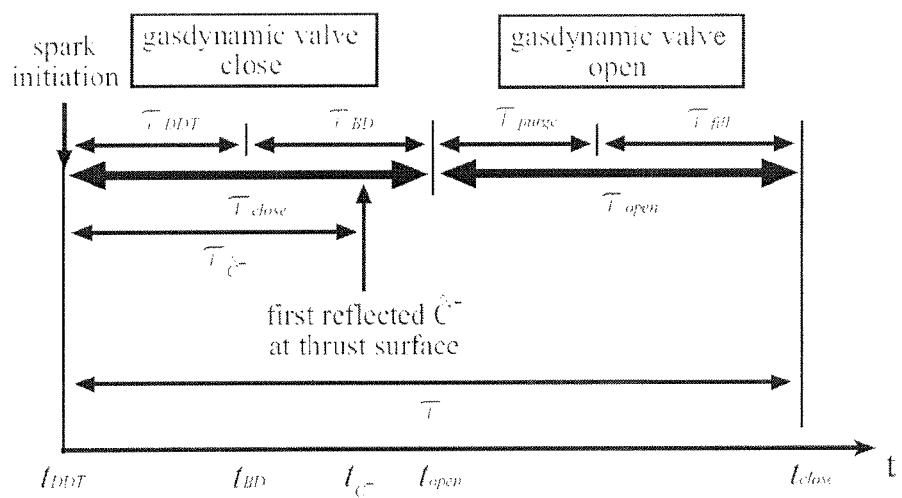
FIG. 7 is a timing diagram of a cycle of the valveless PDC.

A gasdynamic valve cycle time of the valveless PDC is dependent on the detonation wave dynamics in the rig configuration. In general, a PDC cycle consists of four distinct processes occurring sequentially. The processes and associated time duration are defined as (i) detonation initiation and DDT process, $\tau_{DDT}$, (ii) blowdown process, $\tau_{BD}$, (iii) purge process, $\tau_{purge}$ and (iv) fill process, $\tau_{fill}$, which are illustrated in detail in FIG. 7. The purging and filling processes occur when the gasdynamic valve is open ($\tau_{open}$). The gasdynamic cycle time, $\tau$, of the valveless PDC 10 is obtained via summation of gasdynamic valve open and close times, the former including actual fill and purge processes $$\tau = \tau_{DDT} + \tau_{BD} + \tau_{purge} + \tau_{fill} \quad (1)$$
$$= \tau_{close} + \tau_{open}(\tau_{open} = \tau_{purge} + \tau_{fill}). \quad (2)$$

The gasdynamic valve cycle time of the valveless PDC is required to be less than the spark interval time which controls the operating frequency of the valveless PDC. The gasdynamic valve opening duration, $\tau_{open}$, consists of the purge and the fill process and the time required for the fill process, $\tau_{fill}$, can be approximately estimated by a one-dimensional uniform flow at ambient condition as follows $$\tau_{fill} = \frac{\rho_{mix} V_{pdc}}{\dot{m}_{mix}}. \quad (3)$$

where $\rho_{mix}$ and $\dot{m}_{mix}$ are suitable average values for a given cycle. The combustible mixture density, $\rho_{mix}$ was approximated to be an ambient condition due to its low fill speed and no significant ram pressure decrease can be expected. The time required for the purge process, $\tau_{purge}$, can be approximately estimated by the time between when self-aspiration of air starts and when self-aspiration of fuel starts but the purge time, $\tau_{purge}$, may be significantly lower than the fill time, $\tau_{fill}$. The purge process creates a small buffer zone between reactants and products in order to avoid an autoignition of reactants during the fill process. The timing and duration of the purge process are dependent on the configuration of the valveless PDC and respective manifold pressures.

The gasdynamic valve closing duration, $\tau_{close}$, consists of the detonation initiation and DDT process and the blowdown process. The gasdynamic valve closing duration is also related to the characteristic time, $\tau_{\hat{C}^-}$. The pressure at the thrust surface remains constant until the first reflected characteristic from the tube's open end reaches the thrust surface at time, $\tau_{\hat{C}^-}$. When the thrust surface is pressurized in addition to the inlet section, fuel and air mass fluxes from their inlet ports are decelerated by a compression wave which is described by the following relation based on the method of characteristics $$J^+ = u_1 + \frac{2}{\gamma-1}c_1 = u + \frac{2}{\gamma-1}c = (const) \quad (4)$$
$$\Rightarrow \frac{u}{c_1} = \frac{J^+}{c_1} - \frac{2}{\gamma-1}\frac{c}{c_1} \quad (5)$$
$$= \frac{J^+}{c_1} - \frac{2}{\gamma-1}\left(\frac{P}{P_1}\right)^{\frac{\gamma-1}{2\gamma}} \left(<\frac{u_1}{c_1}\right) \quad (6)$$

assuming that a transmitted compression wave propagating to upstream of the manifolds is weak enough to maintain isentropic conditions. The gasdynamic valve continues to be closed until the thrust surface is depressurized. When the inlet section is depressurized, an expansion wave is initiated and propagates into manifolds causing acceleration of fuel and air masses. The gasdynamic valve closing duration is a design parameter constrained by the size of the valveless PDC including the manifold arrangement which regulates arrival of reflected characteristics, and the minimum manifold pressure which regulates onset of closing and opening time of the gasdynamic valve.

In order to estimate the gasdynamic valve closing duration, $\tau_{close}$: fuel and air manifold pressures were measured. The gasdynamic valve closing duration is approximately estimated by measuring time between spark initiation, $t_{DDT}$, and peak pressure detected at each manifold, $t_{peak}$. As a result, the gasdynamic valve cycle time of the valveless PDC has the following relation:

$$\tau = \tau_{close} + \tau_{open} \approx (t_{peak} - t_{DDT}) + \tau_{fill}. \quad (7)$$

assuming that $\tau_{purge} \ll \tau_{fill}$ and $t_{peak} \approx t_{open}$. A reciprocal of the spark initiation frequency requires to be greater than the gasdynamic cycle time, t, which controls an operating frequency of the valveless PDC.

Figure 8:
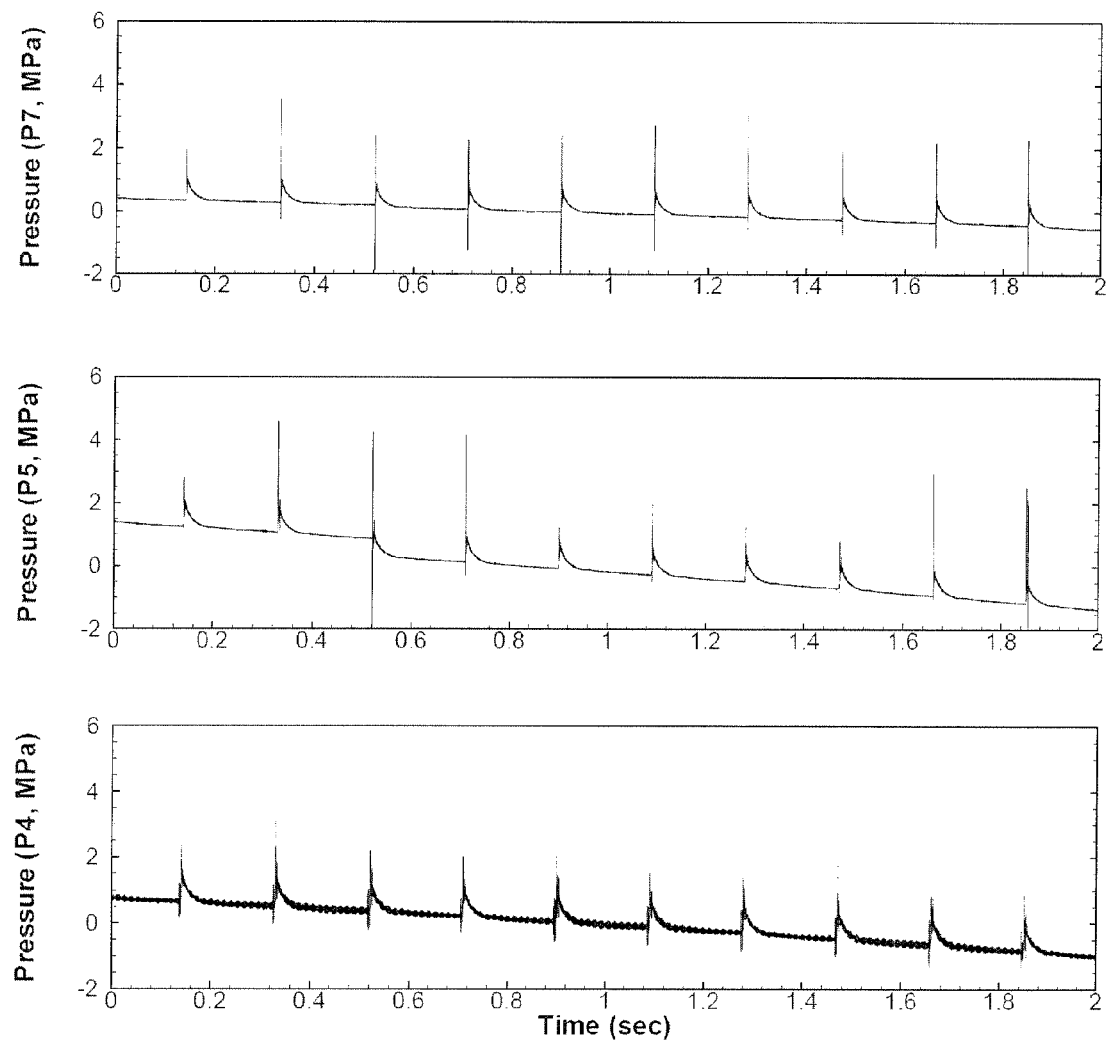
FIG. 8 shows pressure-time histories recorded for $C_2H_4$—air mixture with $\emptyset=1.1$, a fill fraction of 1.7 and an operating frequency of 5.26 Hz.
Figure 9:
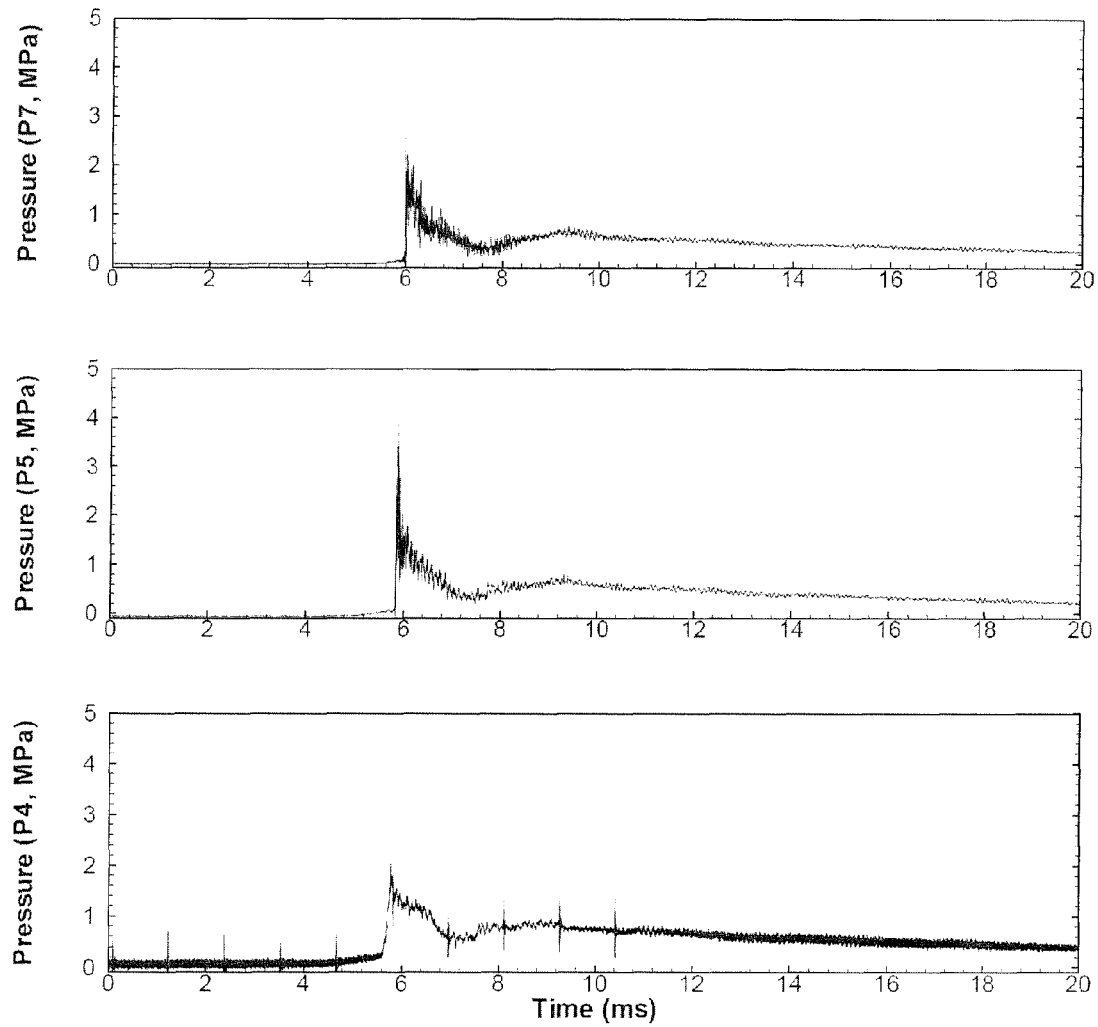
FIG. 9 shows pressure-time histories recorded for $C_2H_4$—air mixture with $\emptyset=1.1$, a fill fraction of 1.7 and an operating frequency of 5.26 Hz; a single pulse extracted from the multi-cyclic pressure history.
Figure 10:
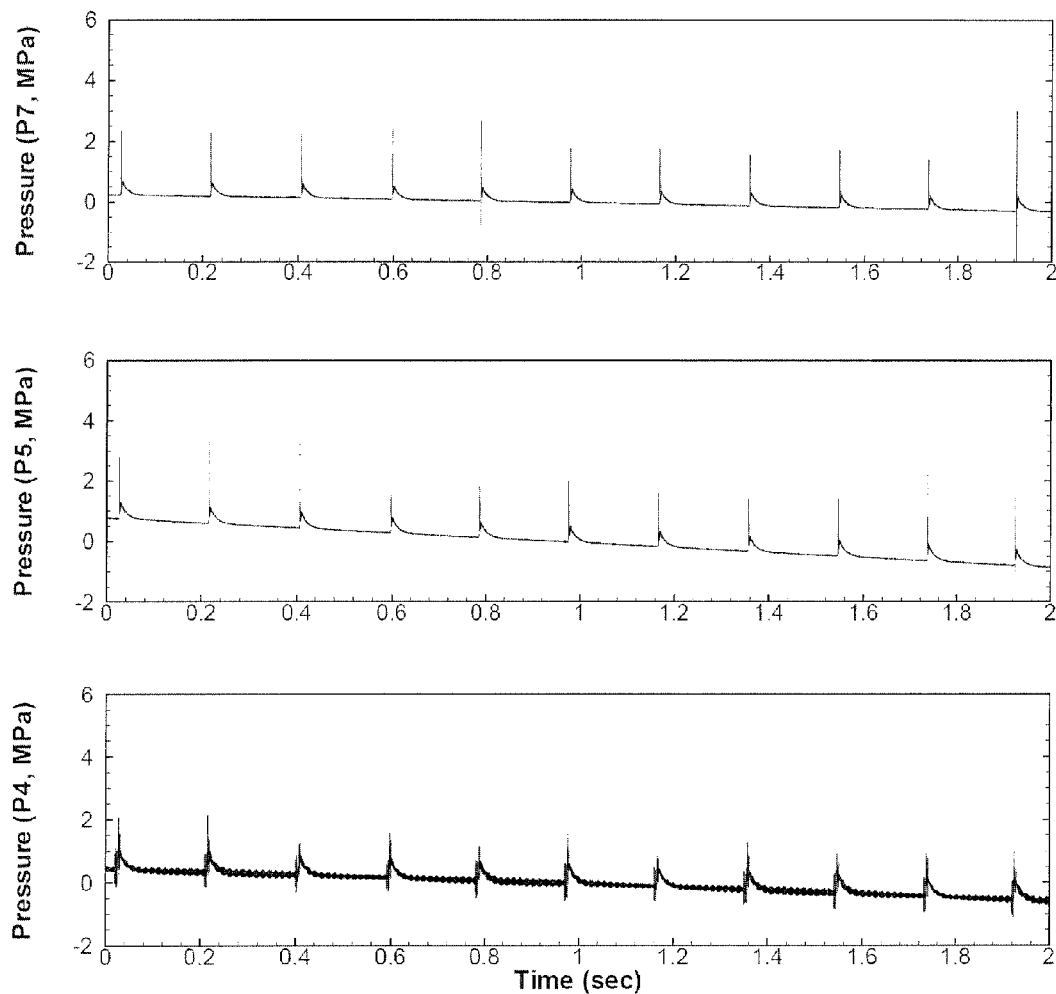
FIG. 10 Pressure-time histories recorded for $C_2H_4$—air mixture with $\emptyset=1.1$, a fill fraction of 1.1 and an operating frequency of 5.26 Hz; typical pressure histories in multi-cyclic operation of the valveless PDC.
Figure 11:
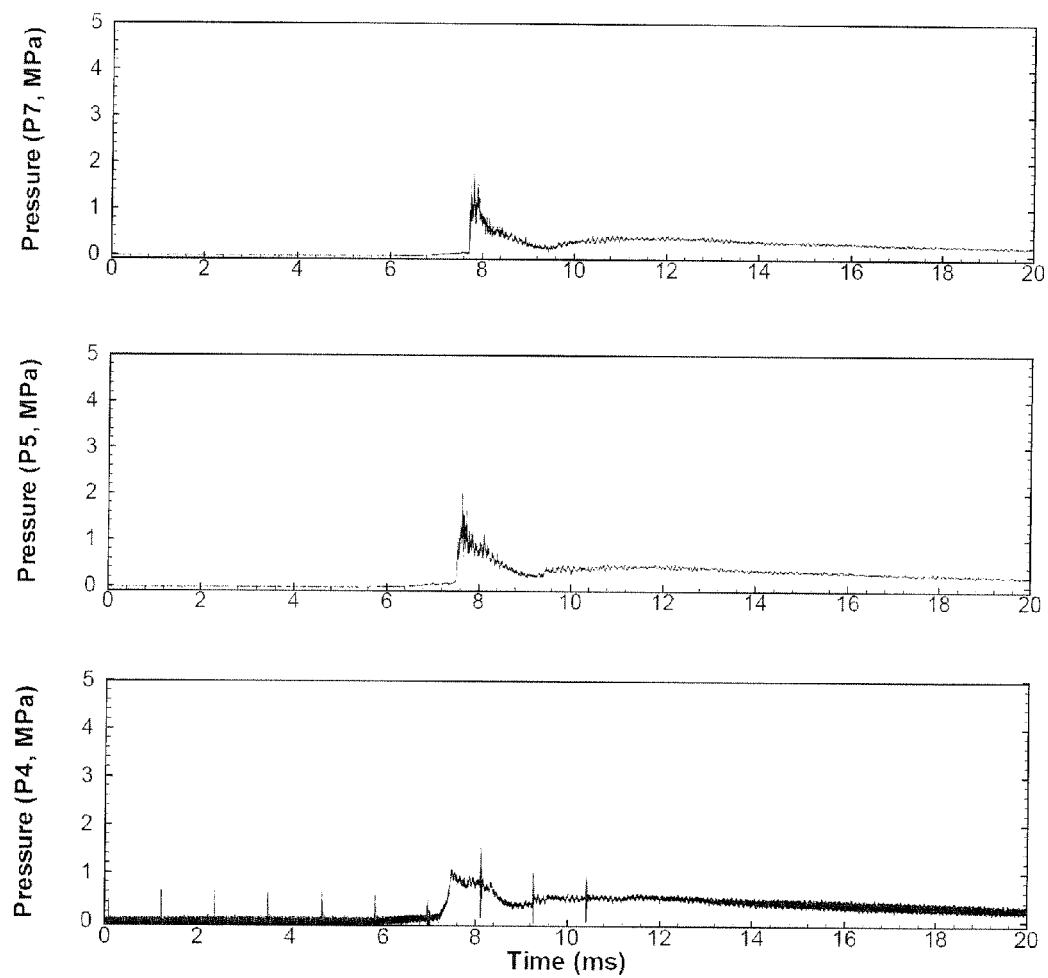
FIG. 11 Pressure-time histories recorded for $C_2H_4$—air mixture with $\emptyset=1.1$, a fill fraction of 1.1 and an operating frequency of 5.26 Hz; a single pulse extracted from the multi-cyclic pressure history.
Figure 12:
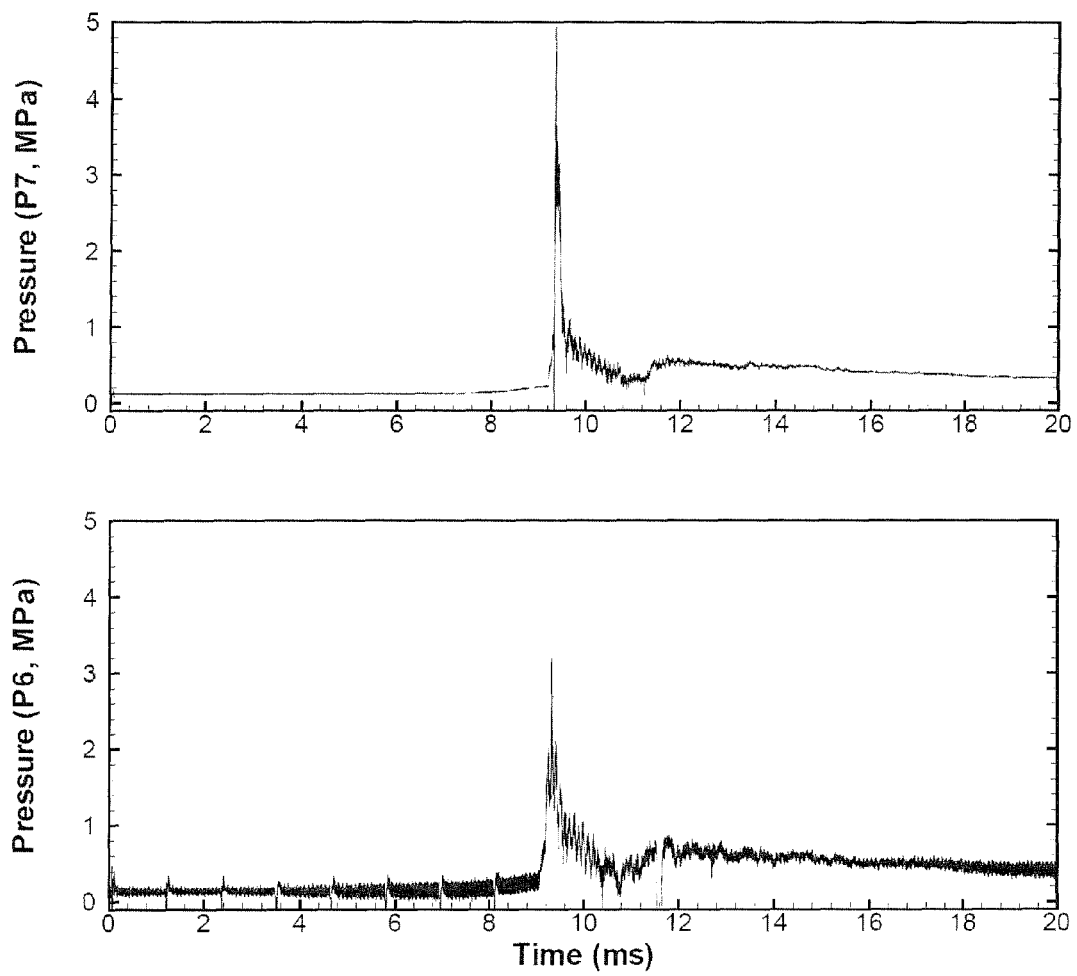
FIG. 12 Pressure-time histories recorded for $C_3H_8$—air mixture with $\emptyset=1.1$, a fill fraction of 2.3 and an operating frequency of 1.54 Hz FIG. 13 Pressure histories recorded at the inlet and vortex generator sections for $C_2H_4$—air mixture with $\emptyset=1.1$, a fill fraction of 1.7 and an operating frequency of 5.26 Hz.

Pressure data is presented in this here to illustrate the internal flowfield in the detonation tube 16 of the valveless PDC 10. The experiments described were carried out at atmospheric initial pressure with an averaged equivalence ratio of 1.1 for ethylene-air combustion mixture and an operating frequency of 5.26 Hz. Pressure data for the same averaged equivalence ratio of 1.1 for propane-air combustion mixture under an operating frequency of 1.54 Hz are also presented in FIG. 12 in order to show initiation of the DDT process with a heavier hydrocarbon fuel. Typical time histories of multicyclic pressure pulses measured along the detonation tube are presented in FIGS. 8 and 10 in order to show repeatability of combustion waves. (The downward slope in pressure in FIG. 8 is due to transducer drift due to heating.) FIGS. 9 and 11 represent a single pulse history obtained from the multi-cyclic operation with a specified fill fraction. There are variations of pressure magnitude for each wave as shown in FIGS. 8 and 10 but FIGS. 9 and 11 represent general trends for their specific conditions. In order to clarify a wave propagation process, time axis is taken on the abscissa, where zero corresponds to the time of spark ignition. Pressure magnitude is taken on the ordinate, where zero corresponds to the reference pressure. Tracking each peak of a pressure history permits construction of the pressure wave trajectory down the tube and the deflagration to detonation transition (DDT) process. Data in FIG. 9 indicate acceleration to peak detonation conditions by the time the wave reaches the location of transducer P5 with peak pressures in excess of 4 MPa at this locale.

Data for fill fraction of approximately 1.7 and 1.1 appear in FIGS. 9 and 11, respectively. Note that the fill fractions were estimated by the following equation:

$$FF = \frac{\dot{V}\left(\frac{1}{f_{ap}} - \tau_{close}\right)}{V_{pdc}} \quad (8)$$

$$\approx \frac{\dot{V}\left\{\frac{1}{f_{ap}} - (t_{peak} - t_{DDT})\right\}}{V_{pdc}}. \quad (9)$$

At 1.7 fill fraction (FIG. 9), the maximum peak pressure is 4.18 MPa, which is greater than the Chapman-Jouguet detonation pressure of 1.89 MPa, indicating possible presence of a overdriven detonation. The wave speed is 1917 m/s measured between P5 and P7, which is greater than the Chapman-Jouguet detonation speed of 1846 m/s. At a 1.1 fill fraction (FIG. 11), the maximum peak pressure is 2.04 MPa, which is close to the Chapman-Jouguet detonation pressure of 1.89 MPa but the wave speed is 1104 m/s measured between P5 and P7 indicating that it resides in a choked flame regime or a pressure wave decoupled from a reaction zone. At 2.3 fill fraction with propane-air mixture (FIG. 12), the maximum peak pressure is 4.93 MPa and the wave speed is 2116 m/s, which are greater than the Chapman-Jouguet detonation pressure of 1.88 MPa and the Chapman-Jouguet detonation speed of 1819 m/s indicating presence of a overdriven detonation. The large fill fractions required to attain maximum performance are indicative of poor mixing of the fuel and air streams. Optimization of the mixing process was not objective of the present study.

Although the equivalence ratios of these fill fraction conditions are the same, different attributes of combustion waves were observed in the detonation tube. This observation is associated with the fact that an actual filling time is regulated by filling/mixing process in a certain configuration of PDC. The time required to get a sufficient fill of PDC for DDT initiation is reduced by a higher set fill fraction (i.e. mass flow rate) and lower set fill fraction may not provide enough fill of combustible mixture within a spark interval time to initiate a DDT. Note that a higher set fill fraction increases a fill speed but simultaneously it causes flame stabilization issues in this head-end filling scheme configuration.

Figure 13:
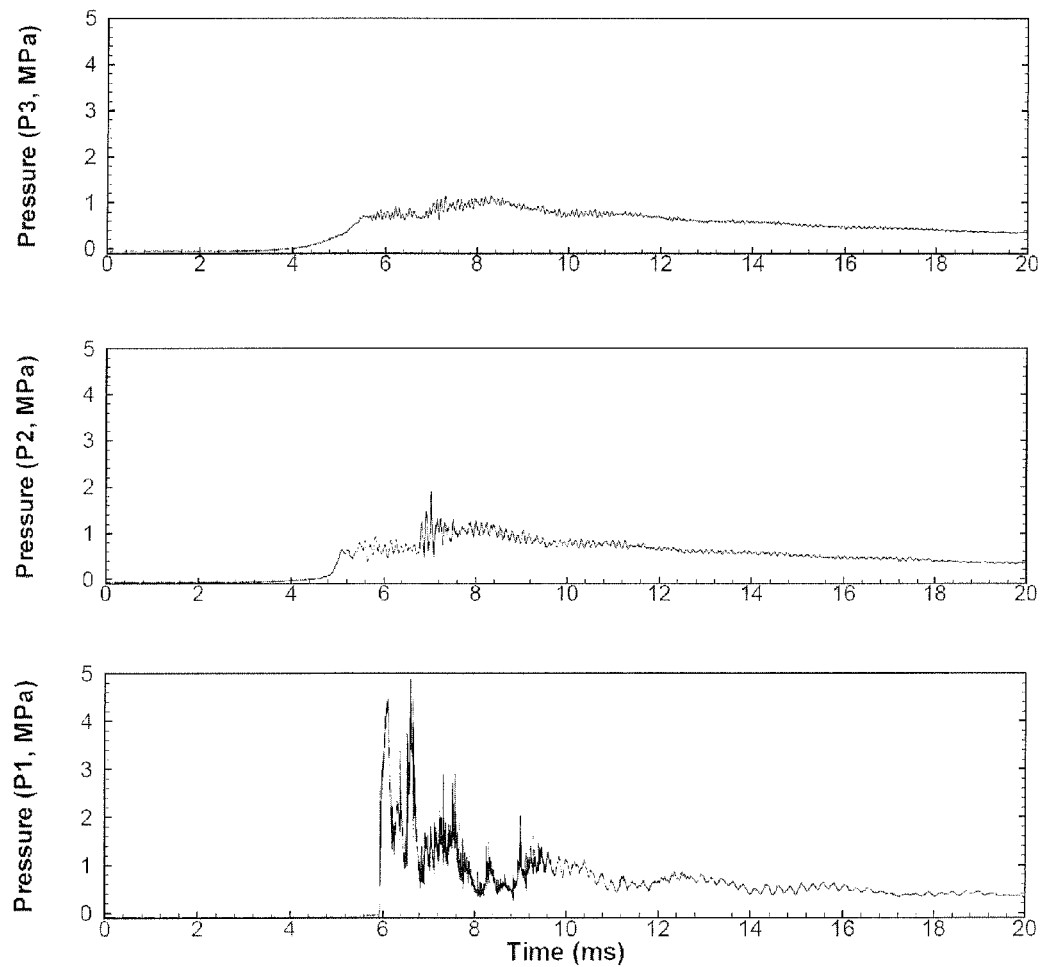
Figure 14:
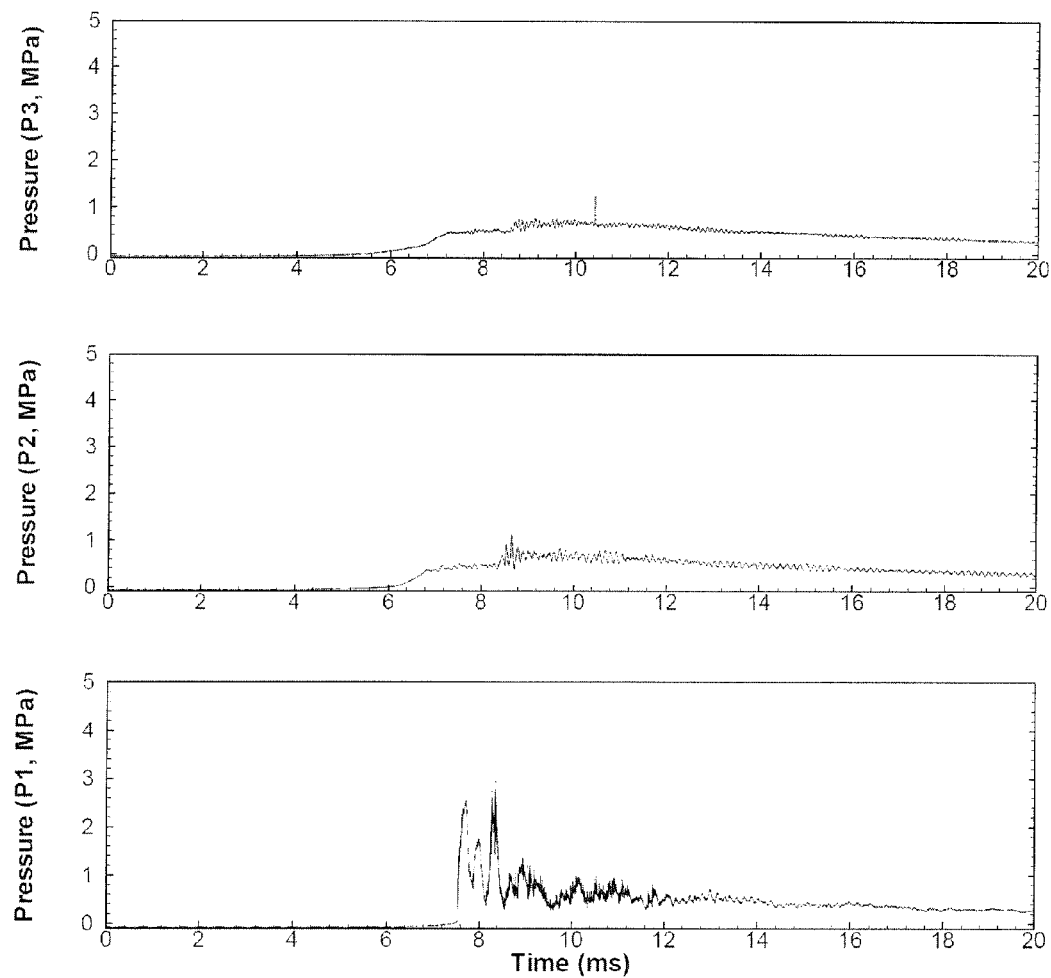
FIG. 14 Pressure histories recorded at the inlet and vortex generator sections for $C_2H_4$—air mixture with $\square=1.1$, a fill fraction of 1.1 and an operating frequency of 5.26 Hz.

Pressure data at the inlet and vortex generator sections appear in FIGS. 13 and 14 illustrating the case of ethylene-air mixture with equivalence ratio of 1.1 and operating frequency of 5.26 Hz but different fill fractions of 1.7 and 1.1, respectively. In order to clarify a wave propagation process, the time axis is taken on the abscissa, where zero corresponds to the time of spark ignition, and pressure magnitude along the valveless PDC is taken on the ordinate. The ignition sources were located at the vortex generator section (FIG. 5) so that the first pressure rise was detected by the pressure transducer located at P3. A transmitted compression wave propagating toward the thrust surface is observed in the pressure histories as described in FIG. 6.

A significant pressure rise is detected at the thrust surface (P1) for the fill fraction of 1.7 as shown in FIG. 13 due to a transmitted shock propagation on area convergence which is stronger than the incident shock. There are two peak pressure spikes over 4 MPa detected at P1 within 1 ms and are greater than the Chapman-Jouguet detonation pressure of 1.89 MPa (FIG. 13). A plateau pressure region including these two pressure spikes appears for about 7 ms (6 ms~13 ms) at P1 which is followed by a region of decreasing pressure caused by numerous reflected characteristics as shown in FIG. 13. The other plateau regions detected at P2 and P3 also appear for about 7 ms (5 ms~12 ms for both P2 and P3) which are also followed by a region of decreasing pressure caused by numerous reflected characteristics as shown in FIG. 13. A reflected shock at the thrust surface is observed as a weak pressure spike at the pressure transducers located at P2 and P3 around 7 ms in FIG. 13. Onset of pressure decrease due to arrival of the first reflected characteristic: C— is started from the transducer close to the exit end of detonation tube (P3).

A similar pressure-time trace is also measured at the thrust surface (P1) for the fill fraction of 1.1 as shown in FIG. 14 due to a transmitted shock propagation on area convergence which is stronger than the incident shock. However, the magnitude of the transmitted shock is much smaller than for the fill fraction of 1.7 due to its failure to initiate a successful DDT as shown in FIG. 11. There are two peak pressure spikes over 2 MPa detected at P1 within 1 ms (14). A plateau pressure region including these two pressure spikes appears for about 6 ms (7 ms~13 ms) at P1 which is followed by a region of decreasing pressure caused by numerous reflected characteristics as shown in FIG. 14. The other plateau regions detected at P2 and P3 also appear for about 6 ms (7 ms~13 ms for both P2 and P3) which are also followed by a region of decreasing pressure caused by numerous reflected characteristics as shown in FIG. 14. A reflected shock at the thrust surface is observed as a weak pressure spike at the pressure transducers located at P2 and P3 around 9 ms in FIG. 14.

Figure 15:
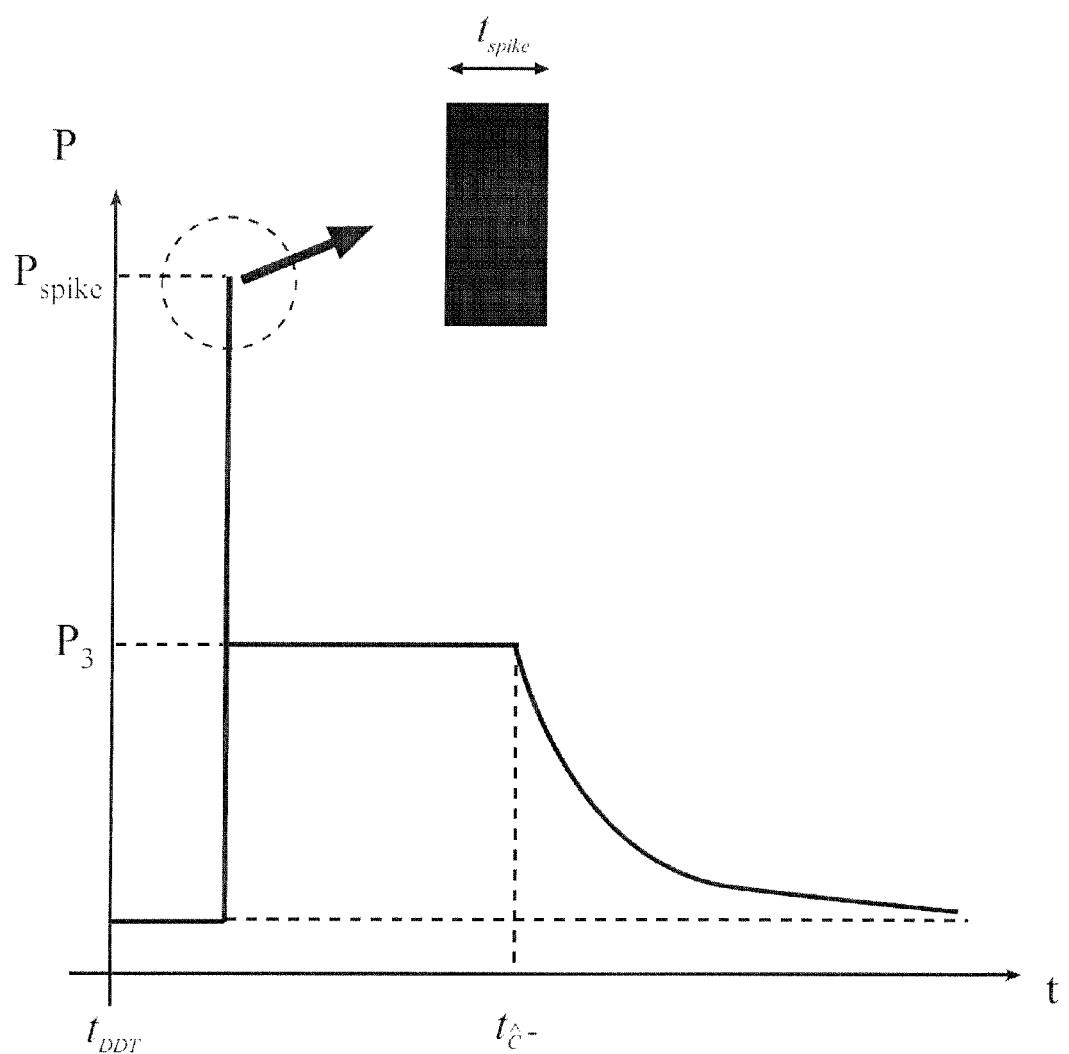
FIG. 15 Idealized model of pressure history at the thrust surface.

The pressure-time traces detected at P1 for both 1.7 and 1.1 of the fill fractions were compared with the idealized pressure-time trace model at the thrust surface for a straight detonation tube proposed by Wintenberger et al., which are given in Table 1 and its schematic of the pressure-time trace is presented in FIG. 15. Both of the pressure spikes detected at the thrust surface are higher than the pressure spike estimated as the Chapman-Jouguet detonation for a straight detonation tube partly due to the contracting configuration of the inlet section 12. Successful DDT initiation for the fill fraction of 1.7 creates a higher magnitude of pressure waves than for the fill fraction of 1.1, which may be caused by three dimensional effects of filling/mixing process associated with filling time of the combustor. In addition, there is ignition delay observed in FIG. 14 compared with FIG. 13, which may be caused by the same reason. Note that the gasdynamic valve was functioned for both fill fractions of 1.1 and 1.7 as long as magnitude of the transmitted shock has a certain value associated with manifold pressure.

TABLE 1

Comparisons between pressure at the thrust surface for a straight tube configuration estimated by Wintenberger and pressure measured at the thrust surface in the valveless PDC; $C_2H_4$ - air mixture with an operating frequency of 5.26 Hz.

| Data source | φ | Fill fraction | $P_1$, MPa | $T_1$, K | $P_{spike}$, MPa | $P_3$, MPa | $t_{spike}$, ms |
|---|---|---|---|---|---|---|---|
| Wintenberger[30] | 1.0 | 1.0 | 0.1 | 300 | 1.825 | 0.684 | — |
| Present work | 1.1 | 1.7 | 0.1 | 298 | >4.46 | >0.67 | >0.5 |
| Present work | 1.1 | 1.1 | 0.1 | 298 | >2.56 | >0.34 | >0.5 |

Figure 16:
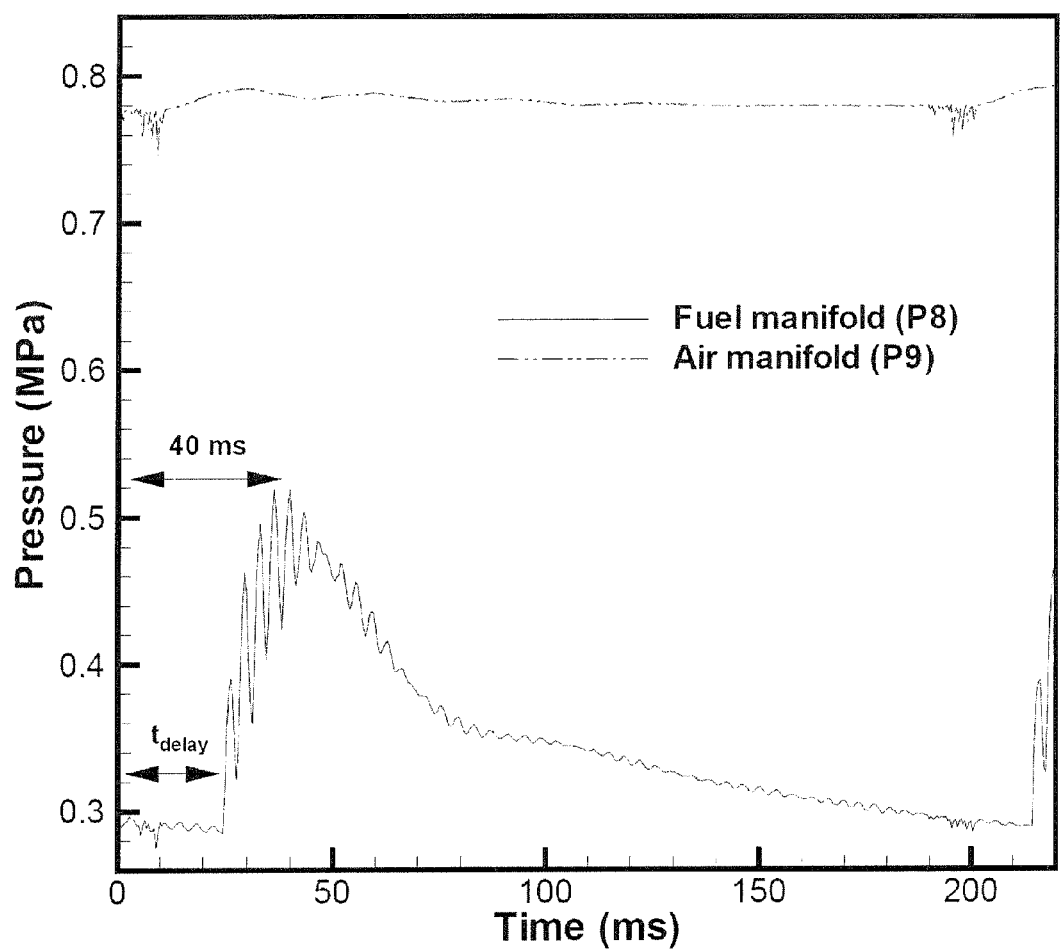
FIG. 16 Pressure histories at fuel and air manifold recorded for $C_2H_4$—air mixture with $\emptyset=1.1$, a fill fraction of 1.7 and an operating frequency of 5.26 Hz.
Figure 17:
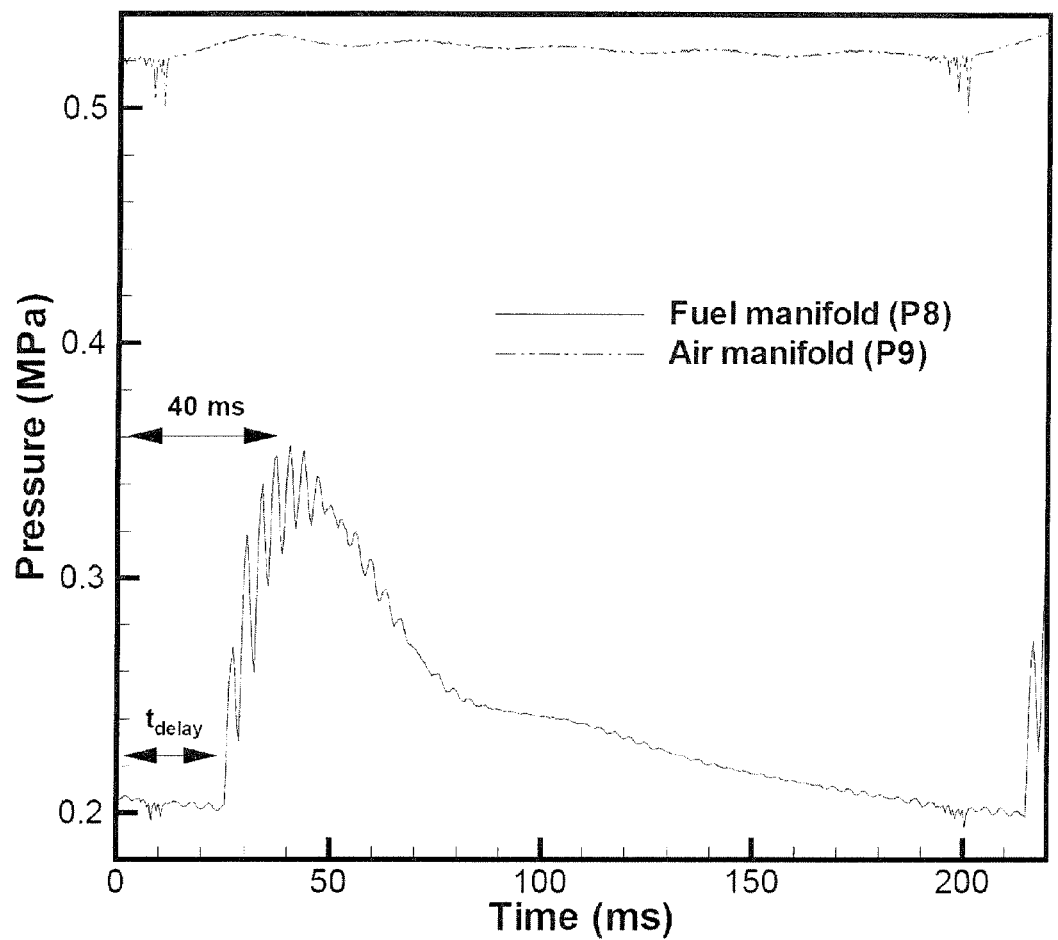
FIG. 17 Pressure histories at fuel and air manifold recorded for $C_2H_4$—air mixture with $\emptyset=1.1$, a fill fraction of 1.1 and an operating frequency of 5.26 Hz.

Typical pressure data for the fuel and air manifolds (P8 and P9 in FIG. 5) are depicted in FIGS. 16 and 17 for the case of ethylene-air mixture with equivalence ratio of 1.1 and operating frequency of 5.26 Hz but with different fill fractions of 1.7 and 1.1, respectively. The time of spark ignition corresponds to 0 ms in FIGS. 16 and 17. A pressure rise caused by a pressure build-up at the inlet section is observed with a pressure transducer at both fuel and air manifold in FIGS. 16 and 17. There are pressure oscillations detected at a rising edge at the fuel manifold (P8) for both the fill fractions cases probably because of structural response of the flex lines. The pressure difference at the inlet port allows a transmitted compression wave to propagate toward both fuel and air manifolds which consequently causes the entire reactant flow flux to decelerate.

FIG. 16 shows that minimum manifold pressures for the air and fuel systems are approximately 0.78 MPa and 0.29 MPa, respectively. A combination of fuel and air minimum manifold pressures regulates timing of purging and filling processes in the valveless PDC. The manifold pressure for the air system is higher than the manifold pressure for the fuel system enabling the gasdynamic valve for the air system to open itself prior to the one for the fuel system in order to initiate a purging process of combustion products. The purging process creates a buffer zone between combustion products and newly charged reactants, which impedes pre-ignition of the fresh reactants. Fuel is not supplied until pressure at the inlet section is low enough to generate an expansion wave transmitted to the fuel manifold having adequate pressure drop across the manifold. By the use of method of characteristics, time which is required for the head of a compression wave to reach the manifold can be computed. Assuming that mass flow in a reactant supply line is subsonic, a negative sound speed of the first characteristic propagating upstream to the manifold is $$C^- : \frac{dx}{dt} = u - c$$

$$= \frac{\dot{m}}{\rho A} - \sqrt{\gamma RT}. \quad (10)$$

The time when the pressure transducer at the manifold detects the head of compression wave can be computed as $$t_{delay} = \frac{l}{|u-c|} = \frac{l}{\left|\frac{\dot{m}}{\rho A} - \sqrt{\gamma RT}\right|}. \quad (11)$$

The pressure transducers at the fuel manifold (P8) and at the air manifold (P9) detected their pressure rises at 11 ms (estimated time: 13.0 ms) and 25 ms (estimated time: 28.9 ms) as shown in FIG. 16 having a reasonable agreement with estimated times. A pressure peak detected at the fuel manifold appears approximately within 40 ms from a spark initiation, which is relatively consistent in every cycle. FIG. 17 also shows that a pressure detected at the fuel manifold appears approximately within 40 ms from a spark initiation, but the magnitude of pressure rise is less than the other due to the magnitude of plateau pressure at the inlet section.

Figure 18:
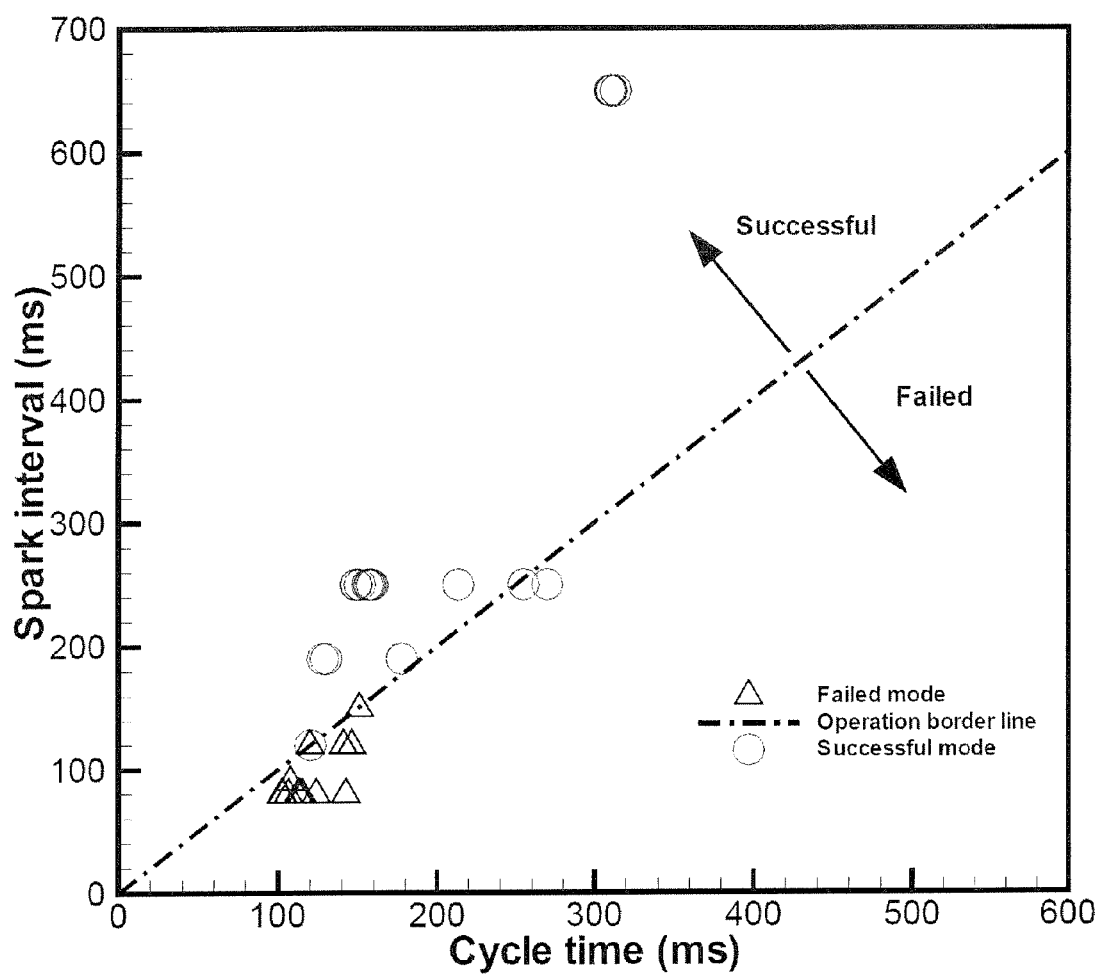
FIG. 18 Relation between the spark interval and the gas-dynamic valve cycle time to describe a possible operational region with the valveless PDC.
Figure 19:
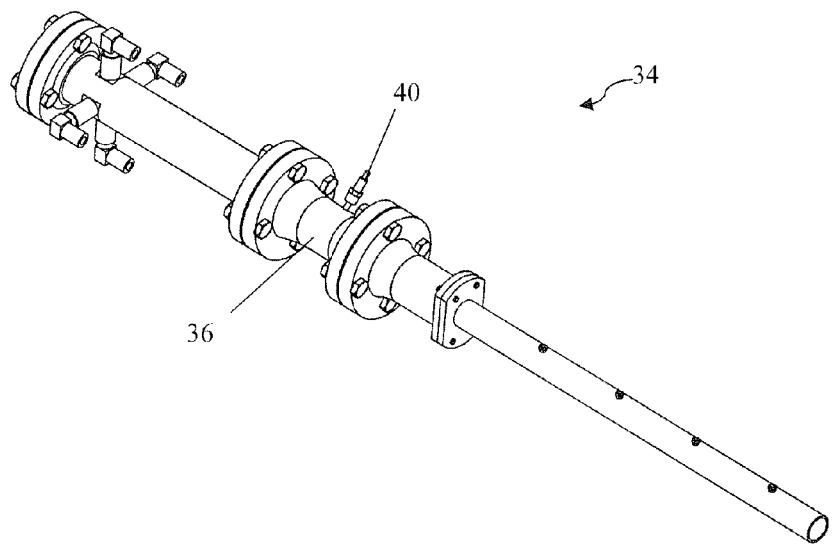
FIG. 19 shows a perspective view of a second embodiment of a valveless PDC according to another aspect of the present invention.
Figure 20:
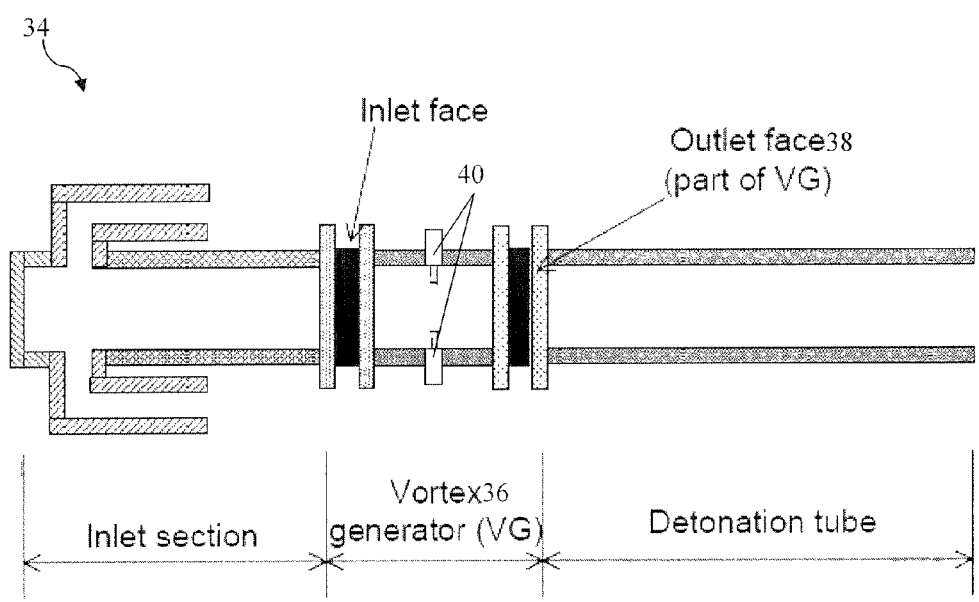
FIG. 20 is a cross-sectional diagram of the valveless PDC shown in FIG. 19.

The performance of the device has been assessed over a wide range of spark intervals. FIG. 18 illustrates the effect of the gasdynamic valve cycle time on spark interval which controls operating frequency of the valveless PDC. The cycle time is approximately estimated using Eq. 7 assuming that the purge process, $\tau_{purge}$, is negligible compared with the fill process, $\tau_{fill}$, and the gasdynamic valve closing duration, $\tau_{close}$, is approximated to be the duration between time of the spark initiation and of the peak pressure detected at the fuel manifold, $t_{peak} - t_{DDT}$. The fill duration, $\tau_{fill}$, is estimated by Eq. 3. Reference for the cycle time corresponds to the spark initiation, $t_{DDT}$. This plot includes all data points describing pulsed combustion modes regardless of their DDT accomplishments. Successful mode designates that a spark frequency corresponds with an actual operating frequency. Failed mode designates that a spark frequency doesn't correspond with an actual operating frequency. Experimental conditions used to generate the plot are listed on Table 2. The gasdynamic valve cycle time is required to be less than the spark interval in order to synchronize spark initiation frequency. Reduction of fill time can be achieved by increasing a fill fraction, reducing a combustor size or optimizing a filling scheme.

TABLE 2

Experimental conditions of the valveless PDC operation; averaged fill fraction and equivalence ratio based on actual frequency, and approximate gasdynamic valve cycle time estimated by Eq. 7 are listed in this table.

| Reactant | Spark frequency, Hz | Actual frequency, Hz | Fill fraction | φ | τ, ms |
|---|---|---|---|---|---|
| $C_2H_4$-air | 5.3 | 5.3 | 1.7 | 1.1 | 128 |
| $C_2H_4$-air | 5.3 | 5.3 | 1.7 | 1.1 | 130 |
| $C_2H_4$-air | 5.3 | 5.3 | 1.1 | 1.1 | 178 |
| $C_2H_4$-air | 8.3 | 8.3 | 1.1 | 0.8 | 120 |
| $C_2H_4$-air | 11.1 | 5.6 | 2.0 | 0.7 | 108 |
| $C_3H_8$-air | 1.5 | 1.5 | 2.3 | 1.0 | 313 |
| $C_3H_8$-air | 1.5 | 1.5 | 2.3 | 1.2 | 310 |
| $C_3H_8$-air | 1.5 | 1.5 | 2.3 | 1.1 | 309 |
| $C_3H_8$-air | 4.0 | 4.0 | 1.8 | 0.9 | 140 |
| $C_3H_8$-air | 4.0 | 4.0 | 1.9 | 1.0 | 158 |
| $C_3H_8$-air | 4.0 | 4.0 | 1.8 | 0.9 | 159 |
| $C_3H_8$-air | 4.0 | 4.0 | 1.2 | 0.9 | 213 |
| $C_3H_8$-air | 4.0 | 4.0 | 0.9 | 1.1 | 255 |
| $C_3H_8$-air | 6.7 | 3.3 | 2.4 | 0.9 | 151 |
| $C_3H_8$-air | 8.3 | 4.1 | 2.1 | 1.0 | 141 |
| $C_3H_8$-air | 8.3 | 4.2 | 2.6 | 0.8 | 120 |
| $C_3H_8$-air | 8.3 | 4.3 | 1.9 | 1.1 | 146 |
| $C_3H_8$-air | 12.5 | 6.2 | 2.0 | 0.9 | 103 |
| $C_3H_8$-air | 12.5 | 6.2 | 1.9 | 0.8 | 102 |
| $C_3H_8$-air | 12.5 | 5.7 | 2.0 | 1.0 | 113 |
| $C_3H_8$-air | 12.5 | 6.0 | 1.9 | 1.0 | 113 |
| $C_3H_8$-air | 12.5 | 6.3 | 1.7 | 1.0 | 110 |
| $C_3H_8$-air | 12.5 | 6.2 | 1.2 | 0.0 | 143 |

While the invention has been illustrated and described in detail in the drawings and foregoing description, the same is to be considered as illustrative and not restrictive in character, it being understood that only the preferred embodiment has been shown and described and that all changes and modifications that come within the spirit of the invention, such as placing a diffuser downstream from the buffer section to feed two detonation tubes, for example, are desired to be protected.

What is claimed is:

1. A valveless pulse detonation combustor having a tube with a closed end and an open end, comprising:
    a flame accelerator within the tube, adjacent the open end;
    a valveless, apertured flow restrictor positioned between said flame accelerator and the closed end of the tube;
    a sparking device within the tube, between said flow restrictor and said flame accelerator;
    a valveless fuel port and a valveless air port through the tube, both ports positioned between said flow restrictor and the closed end of the tube; and
    substantially right-angle manifold passageways in communication with each of said ports.

2. The valveless pulse detonation combustor of claim 1, wherein said flow restrictor has 5 to 10 percent open area.

3. A pulse detonation combustor configured for valveless operation, comprising:
    a generally straight tube having an inlet section, a detonation section and a longitudinal axis through said inlet and detonation sections;
    a flame accelerator within said detonation section of said tube;
    a perforated wall spanning the cross-section of said tube, positioned between said flame accelerator and said inlet section;
    a sparking device within said tube, between said perforated wall and said flame accelerator; and
    a fuel manifold and an air manifold configured to respectively receive fuel and air continuously during operation of said pulse detonation combustor, each said manifold continuously open to said inlet section and each having a junction with said inlet section that is substantially perpendicular to said longitudinal axis.

4. The pulse detonation combustor of claim 3, wherein said perforated wall acts as a stationary flow restrictor.

5. The pulse detonation combustor of claim 3, wherein said fuel manifold is coupled by a fluid line continuously open during operation to a pressurized fuel reservoir.

6. The pulse detonation combustor of claim 5, wherein said air manifold is coupled by a fluid line continuously open during operation to a pressurized air reservoir.

7. The pulse detonation combustor of claim 3, wherein both manifolds are configured to cyclically deliver fluid into said tube.

8. The pulse detonation combustor of claim 7, wherein said manifolds are configured so that air is delivered into said tube by said air manifold before fuel is delivered into said tube by said fuel manifold.

9. The pulse detonation combustor of claim 3, wherein one of said manifolds includes a manifold section with a substantially 90 degree bend.

10. The pulse detonation combustor of claim 3, wherein said tube has a closed end.

11. A pulse detonation combustor configured for valveless operation, comprising:
    a generally straight tube having an inlet section and a detonation section;
    a flame accelerator within said detonation section of said tube;
    a sparking device within said tube, between said inlet section and said flame accelerator;
    a perforated wall spanning the cross-section of said tube and positioned between said inlet section and said sparking device; and
    a fuel supply manifold having a substantially perpendicular junction with said inlet section;
    wherein said inlet section and said manifold are configured as a gasdynamic valve to cyclically deliver a fuel through said perforated wall.

12. The pulse detonation combustor of claim 11, wherein said perforated wall acts as a stationary flow restrictor.

13. The pulse detonation combustor of claim 11, wherein said fuel manifold is coupled by a fluid line continuously open during operation to a pressurized fuel reservoir.

14. The pulse detonation combustor of claim 11, wherein said manifold includes a manifold section with a substantially 90 degree bend.

15. The pulse detonation combustor of claim 11, wherein said tube includes a closed end.

* * * * *